(12) United States Patent
Cheng et al.

(10) Patent No.: US 7,518,810 B1
(45) Date of Patent: Apr. 14, 2009

(54) WIDE-ANGLE LENS WITH HIGH RESOLUTION

(75) Inventors: Ting-Yu Cheng, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/959,243

(22) Filed: Dec. 18, 2007

(30) Foreign Application Priority Data

Oct. 11, 2007 (CN) .................. 2007 1 0201997

(51) Int. Cl.
*G02B 9/60* (2006.01)
(52) U.S. Cl. .................. 359/770; 359/776
(58) Field of Classification Search .......... 359/680, 359/770, 766, 686
See application file for complete search history.

(56) References Cited

U.S. PATENT DOCUMENTS

| | | | | |
|---|---|---|---|---|
| 5,434,713 | A * | 7/1995 | Sato | 359/725 |
| 6,927,923 | B2 * | 8/2005 | Kimura | 359/719 |
| 7,265,912 | B2 * | 9/2007 | Matsusaka | 359/691 |
| 2006/0187557 | A1 | 8/2006 | Yamakawa | |

* cited by examiner

*Primary Examiner*—Timothy J Thompson
(74) *Attorney, Agent, or Firm*—Zhigang Ma

(57) ABSTRACT

An exemplary wide-angle lens includes, in this order from the object side to the image side thereof, a first lens having negative refraction of power, a second lens having positive refraction of power, a third lens 30 having positive refraction of power, and a fourth lens having negative refraction of power, wherein the wide-angle lens satisfies the formulas: R1>R2>0, R1/R2>4.5, R8<R7<0, and 2<|R8/R7|<2.25, where R1 is the radius of curvature of the object-side surface of the first lens, R2 is the radius of curvature of the image-side surface of the first lens, R7 is the radius of curvature of the object-side surface of the fourth lens, and R8 is the radius of curvature of the image-side surface of the fourth lens.

6 Claims, 7 Drawing Sheets

WIDE-ANGLE LENS WITH HIGH RESOLUTION

BACKGROUND

1. Technical Field

The invention relates to wide-angle lenses and, in particular, relates to a wide-angle lens with a high resolution.

2. Description of Related Art

Recently, the market has experienced an increased demand for wide-angle lenses that have a wide field angle to receive a broader view while achieving excellent correction of aberrations (i.e., high resolution) to compliment an increase in the number of pixels of solid state imaging elements such as, coupled charge device (CCD) image sensors or complementary metal oxide semiconductor (CMOS) imaging sensors. However, methods for the correction of aberrations, especially field curvature, distortion, and coma, becomes a challenge when configuring a wide-angle lens having a large field angle, if the configuration of the wide-angle lens (e.g., the number, the position distribution, the refraction power distribution of the lenses employed in the wide-angle lens) have not matured.

Therefore, it is desirable to provide a wide-angle lens, which can overcome the abovementioned problems.

SUMMARY

In a present embodiment, a wide-angle lens includes, in this order from the object side to the image side thereof, a first lens having negative refraction of power, a second lens having positive refraction of power, a third lens 30 having positive refraction of power, and a fourth lens having negative refraction of power, wherein the wide-angle lens satisfies the formulas: R1>R2>0, R1/R2>4.5, R8<R7<0, and 2<|R8/R7|<2.25, where R1 is the radius of curvature of the object-side surface of the first lens, R2 is the radius of curvature of the image-side surface of the first lens, R7 is the radius of curvature of the object-side surface of the fourth lens, and R8 is the radius of curvature of the image-side surface of the fourth lens.

BRIEF DESCRIPTION OF THE DRAWINGS

Many aspects of the present wide-angle lens should be better understood with reference to the following drawings. The components in the drawings are not necessarily drawn to scale, the emphasis instead being placed upon clearly illustrating the principles of the present wide-angle lens. Moreover, in the drawings, like reference numerals designate corresponding parts throughout the several views.

DETAILED DESCRIPTION OF THE EMBODIMENTS

Figure 1:
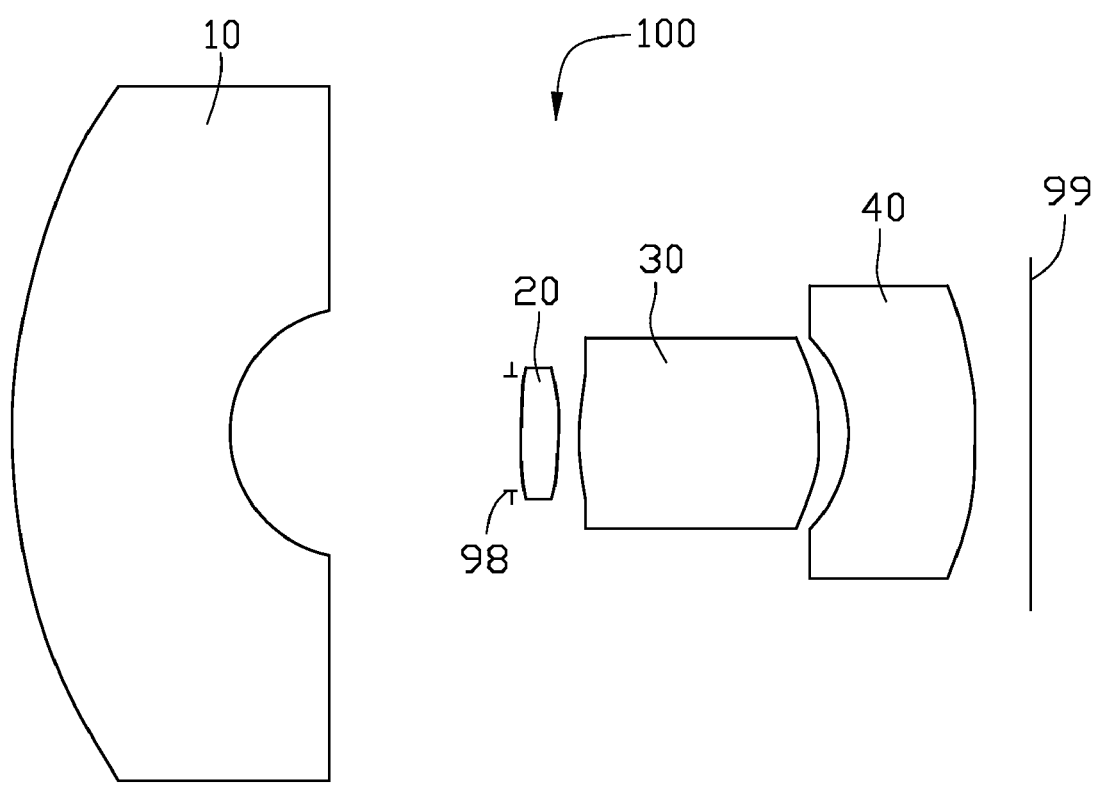
FIG. 1 is a schematic view of a wide-angle lens in accordance with a first embodiment.

Referring to FIG. 1, a wide-angle lens 100 in accordance with a first embodiment includes, in this order from the object side to the image side thereof, a first lens 10 having negative refraction of power, a second lens 20 having positive refraction of power, a third lens 30 having positive refraction of power, and a fourth lens 40 having negative refraction of power. The wide-angle lens 100 satisfies the formulas: (1) R1>R2>0, (2) R1/R2>4.5, (3) R8<R7<0, and (4) 2<|R8/R7|<2.25, where R1 is the radius of curvature of the object-side surface of the first lens 10, R2 is the radius of curvature of the image-side surface of the first lens 10, R7 is the radius of curvature of the object-side surface of the fourth lens 40, and R8 is the radius of curvature of the image-side surface of the fourth lens 40.

The formulas (1), (2) are established for limiting the refraction power of the two surfaces (the object-side surface and the image-side surface) of the first lens 10 to enable the wide-angle lens 100 to receive a broader view (a large field angle). The refraction power distribution of the four lenses 10~40: negative, positive, positive, and negative, is for correcting field curvature and distortion. The formulas (3), (4) are established for limiting the refraction power of the two surfaces (the object-side surface and the image-side surface) of the fourth lens 40 to favorably correct aberrations, especially field curvature, and diction.

Opportunely, the wide-angle lens 100 further satisfies the formula: (5) N1>1.61, where N1 is the refractive index of the first lens 10. This formula is configured to further widen the field angle of the wide-angle lens 100.

Specifically, the wide-angle lens 100 further includes an aperture stop 98. The aperture stop 98 is interposed between the first lens 10 and the second lens 20 to reduce the diameter of light flux entering the wide-angle lens 100. In other words, the aperture stop 98 configured for blocking off-axis light rays entering the wide-angle lens 100 to prevent too much field curvature, distortion, and coma occurring in the wide lens 100, since these off-axis light rays are the main cause of the aforementioned aberrations.

Preferably, the lenses 10~40 is spherical glass lenses to obtain a wide-angle lens with high resolution but low cost.

Detailed examples of the wide-angle lens 100 are given below in company with FIGS. 2~7, but it should be noted that the wide-angle lens 100 is not limited in these examples. Listed below are the symbols used in these detailed examples:

$F_{No}$: F number;

$2\omega$: field angle;

R: radius of curvature;

d: distance between surfaces on the optical axis of the wide-angle lens 100;

N: refractive index of lens; and

V: Abbe constant.

When capturing an image, incident light enters the wide-angle lens 100, transmitting through four lenses 10~40, and is focused onto the image plane 99 to form a visual image.

EXAMPLE 1

Tables 1 shows the lens data of Example 1, where $F_{No}$=2.8, and $2\omega$=111°.

TABLE 1

| Surface | R (mm) | D (mm) | N | V |
|---|---|---|---|---|
| The object-side surface of the first lens 10 | 4.306 | 1.49 | 1.68 | 55.34 |
| The image-side surface of the first lens 10 | 0.885 | 1.92 | — | — |
| The surface of the aperture stop 98 | infinite | 0.072 | — | — |
| The object-side surface of the second lens 20 | 3.378 | 0.25 | 1.67 | 47.25 |
| The image-side surface of the second lens 20 | −2.044 | 0.152 | — | — |

TABLE 1-continued

| Surface | R (mm) | D (mm) | N | V |
|---|---|---|---|---|
| The object-side surface of the third lens 30 | 3.189 | 1.64 | 1.6 | 60.65 |
| The image-side surface of the third lens 30 | −1.37 | 0.19 | — | — |
| The object-side surface of the fourth lens 40 | −0.982 | 0.88 | 1.72 | 29.24 |
| The image-side surface of the fourth lens 40 | −2.746 | 0.37864 | — | — |
| The image plane 99 | infinite | — | — | — |

Figure 2:
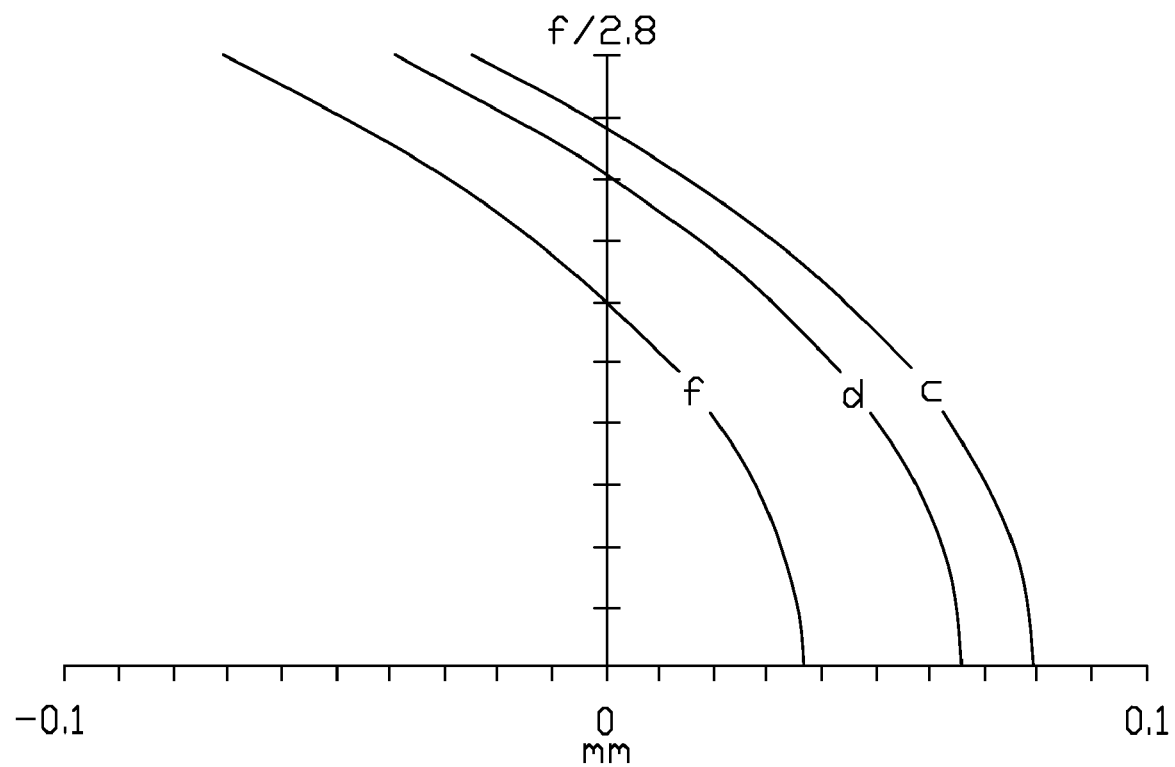
FIG. 2~4 are graphs respectively showing spherical aberration, field curvature, and distortion occurring in the wide-angle lens of FIG. 1, according to a second embodiment.
Figure 3:
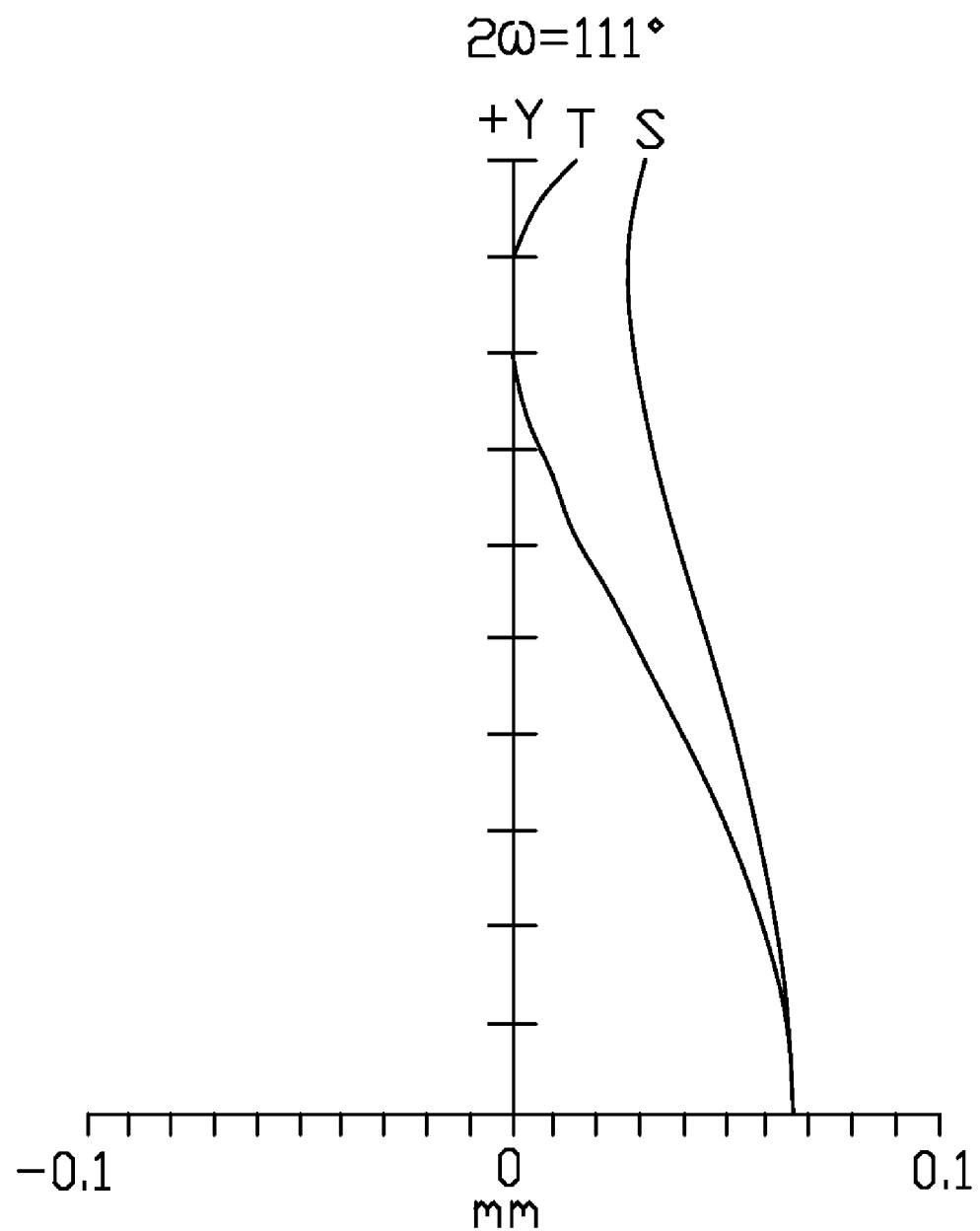
Figure 4:
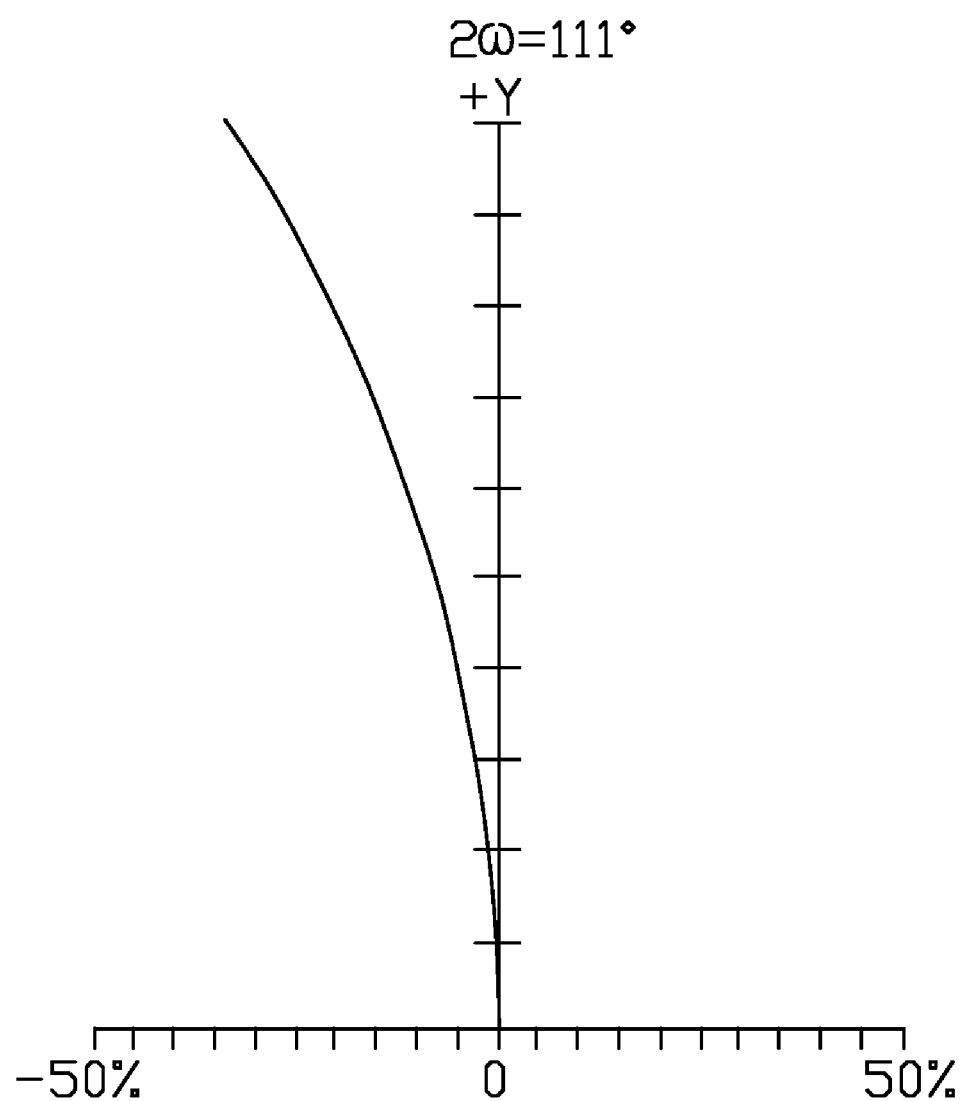

As illustrated in FIG. 2, the curves f, d, and c are respective spherical aberration characteristic curves of f light (wavelength: 486.1 nm), d light (587.6 nm), and c light (656.3 nm) occurring in the wide-angle lens 100 of Example 1. Obviously, spherical aberration occurring in the wide-angle lens 100 of Example 1 is in a range of: −0.1 mm~0.1 mm. In FIG. 3, the curves t, s are the tangential field curvature curve and the sagittal field curvature curve. Clearly, field curvature occurring in the wide-angle lens 100 of Example 1 is limited to a range of: −0.1 mm~0.13 mm. In FIG. 4, distortion occurring in the wide-angle lens 100 of Example 1 is limited to be within the range of: −50%~50%.

EXAMPLE 2

Tables 2 shows the lens data of Example 2, where $F_{No}$=2.8, and 2ω=111°.

TABLE 2

| Surface | R (mm) | D (mm) | N | V |
|---|---|---|---|---|
| The object-side surface of the first lens 10 | 4.762 | 1.79 | 1.62 | 58.17 |
| The image-side surface of the first lens 10 | 0.804 | 1.3 | — | — |
| The surface of the aperture stop 98 | infinite | 0.08 | — | — |
| The object-side surface of the second lens 20 | 3.642 | 0.89 | 1.68 | 54.89 |
| The image-side surface of the second lens 20 | −1.719 | 0.043 | — | — |
| The object-side surface of the third lens 30 | 2.281 | 1.42 | 1.59 | 61.14 |
| The image-side surface of the third lens 30 | −1.523 | 0.22 | — | — |
| The object-side surface of the fourth lens 40 | −1.005 | 0.94 | 1.85 | 23.78 |
| The image-side surface of the fourth lens 40 | −2.223 | 0.29 | — | — |
| The image plane 99 | infinite | — | — | — |

Figure 5:
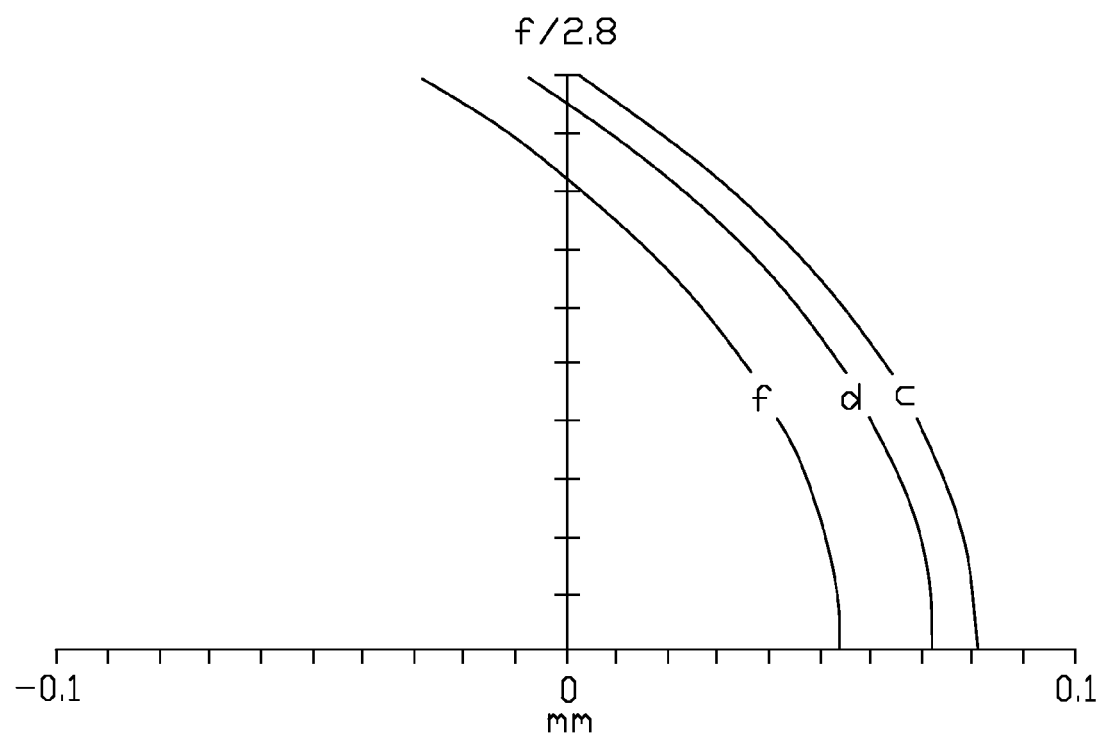
FIG. 5~7 are graphs respectively showing spherical aberration, field curvature, and distortion occurring in the wide-angle lens of FIG. 1, according to a third embodiment.
Figure 6:
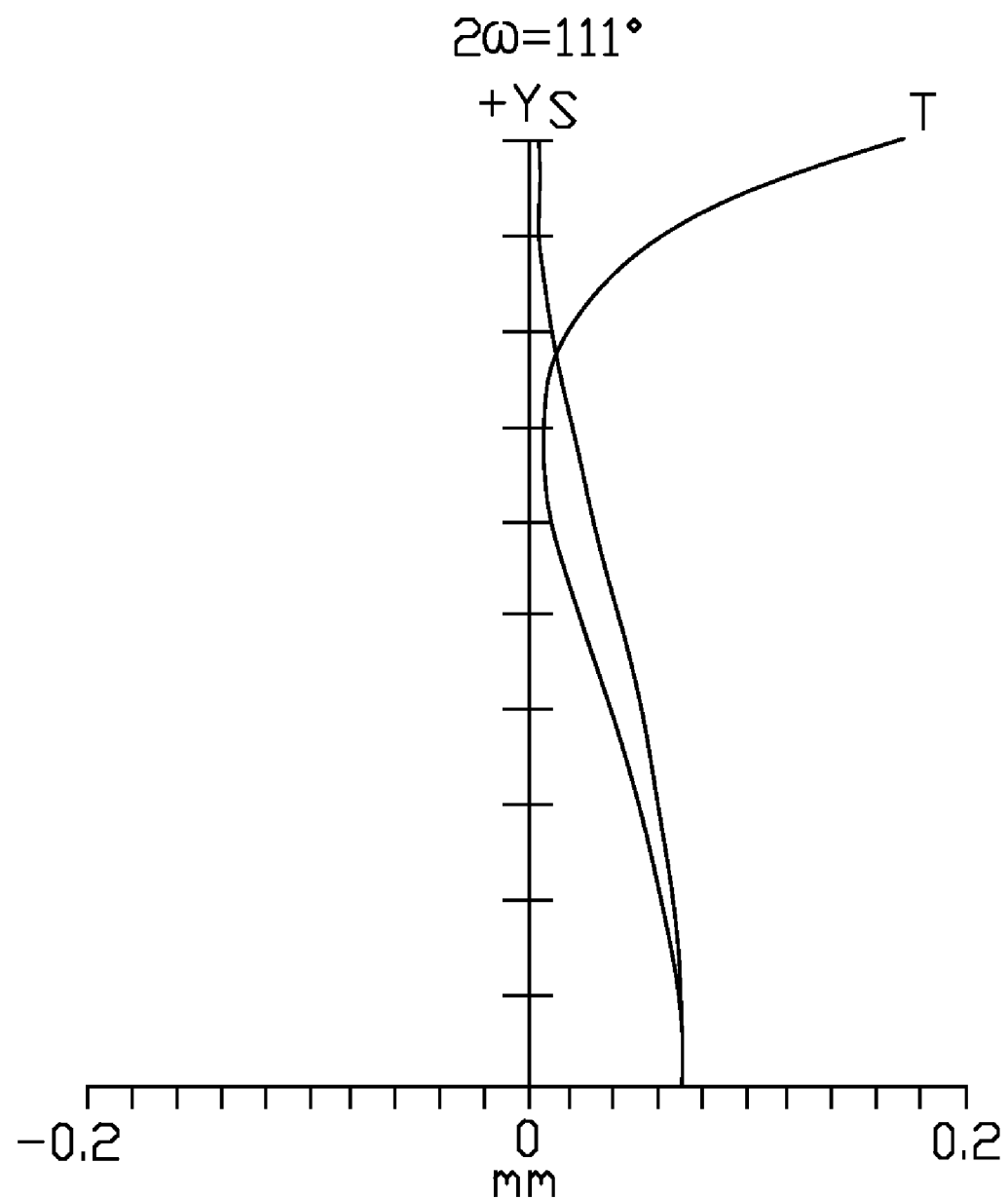
Figure 7:
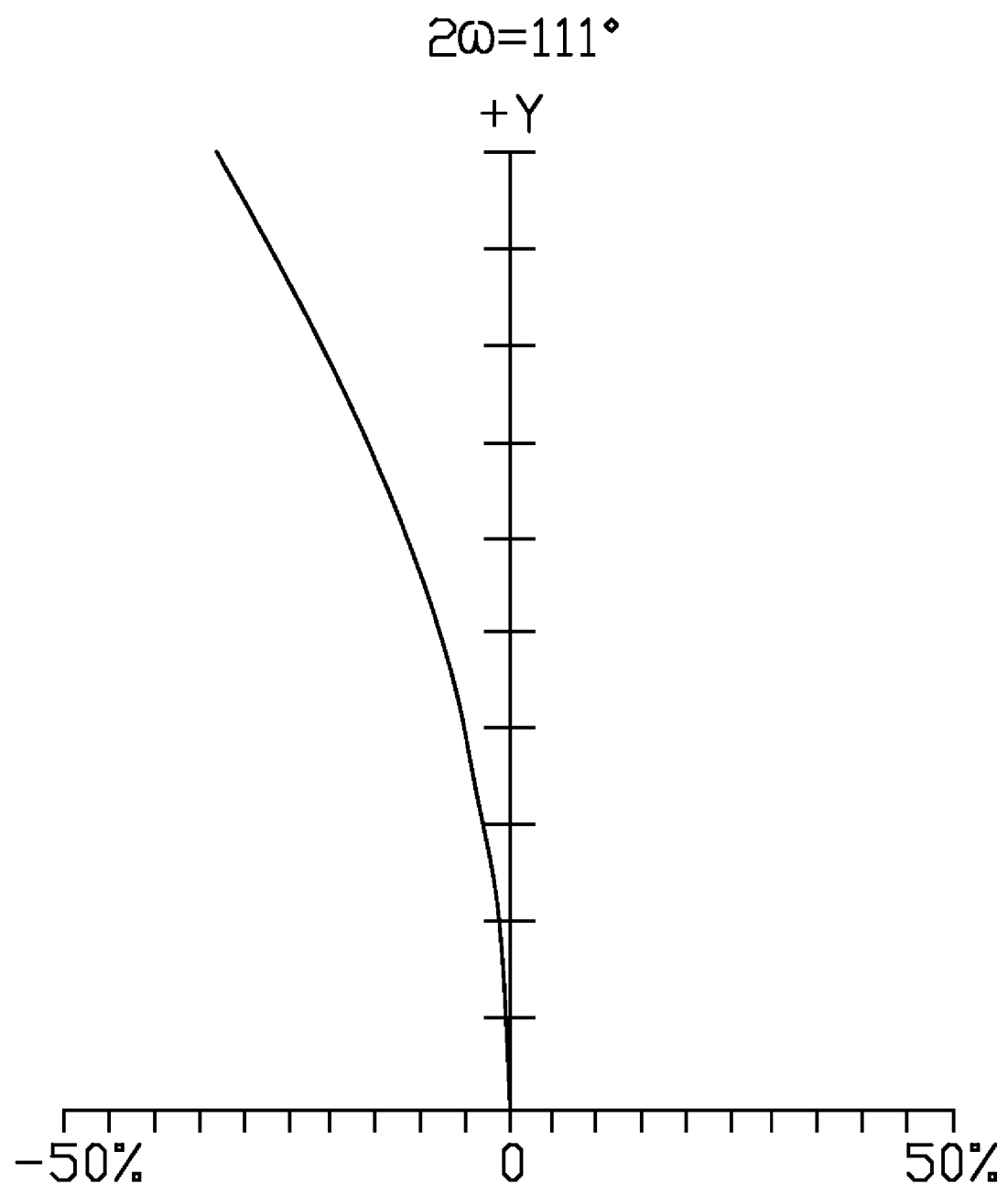

As illustrated in FIG. 5, spherical aberration occurring in wide-angle lens 100 of Example 2 is limited to a range of: −0.1 mm~0.1 mm. As shown in FIG. 6, field curvature occurring in the wide-angle lens 100 of Example 2 is limited to a range of: −0.2 mm~0.2 mm. In FIG. 7, distortion occurring in the wide-angle lens 100 of Example 2 is limited to be within the range of: −50%~50%.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A wide-angle lens comprising, in this order from the object side to the image side thereof,
   a first lens having negative refraction of power,
   a second lens having positive refraction of power,
   a third lens having positive refraction of power, and
   a fourth lens having negative refraction of power,
   In sequence, with no intervening lenses;
   wherein the wide-angle lens satisfies the formulas: R1>R2>0, R1/R2>4.5, R8<R7<0, and 2<|R8/R7|<2.25, where R1 is the radius of curvature of the object-side surface of the first lens, R2 is the radius of curvature of the image-side surface of the first lens, R7 is the radius of curvature of the object-side surface of the fourth lens, and R8 is the radius of curvature of the image-side surface of the fourth lens.

2. The wide-angle lens as claimed in claim 1, further satisfying the formula: N1>1.61, where N1 is the refractive index of the first lens.

3. The wide-angle lens as claimed in claim 1, wherein the first lens, the second lens, the third lens, and the fourth lens are spherical lenses.

4. The wide-angle lens as claimed in claim 1, wherein the first lens, the second lens, the third lens, and the fourth lens are glass lenses.

5. The wide-angle lens as claimed in claim 1, further comprising an aperture stop, the aperture stop being interposed between the first lens and the second lens.

6. The wide-angle lens as claimed in claim 1, wherein the field angle thereof is larger than 110°.

* * * * *